Brubaker & Bonholtzer,
Blacksmiths' Tongs.
Nº 26,250.      Patented Nov. 29, 1859.
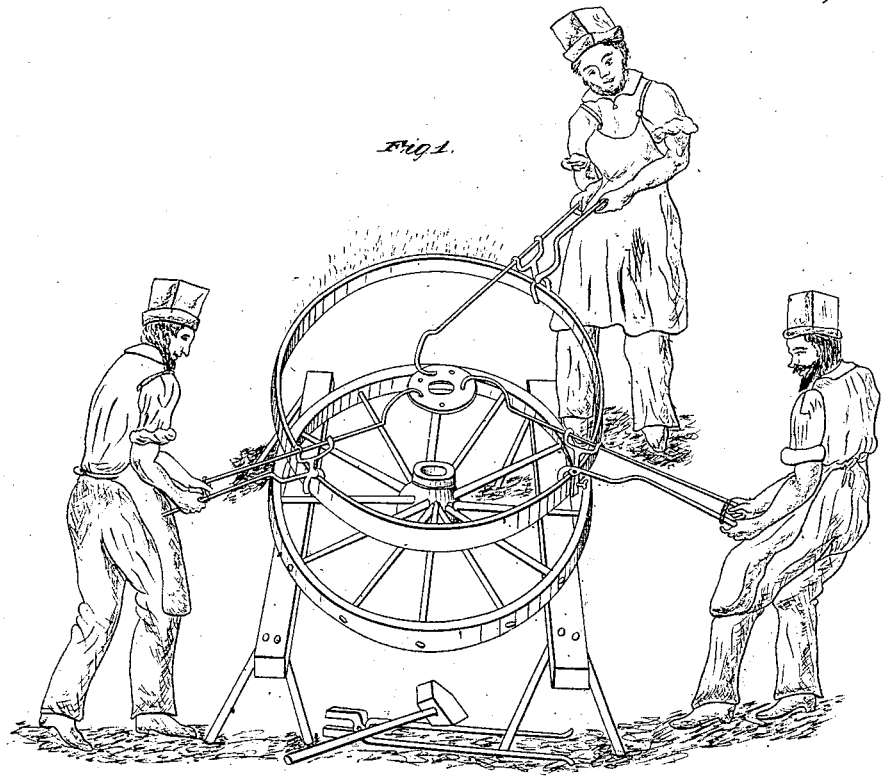
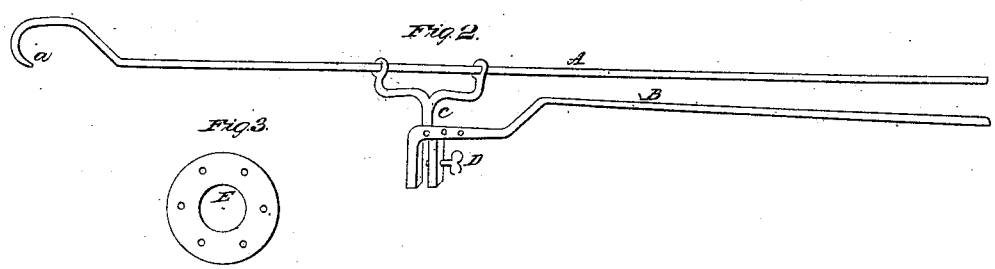
Witnesses:
Jacob Stauffer
S. G. Musser
Inventors:
John Brubaker
Henry Bonholtzer

UNITED STATES PATENT OFFICE.

JOHN BRUBAKER AND H. BONHOLTZER, OF LANCASTER COUNTY, PENNSYLVANIA.

TOOL FOR HANDLING TIRES.

Specification of Letters Patent No. 26,250, dated November 29, 1859.

*To all whom it may concern:*

Be it known that we, JOHN BRUBAKER and HENRY BONHOLTZER, both of the county of Lancaster, in the State of Pennsylvania, have jointly invented a new and useful Implement or Tong and Ring to Facilitate the Handling of Heavy Heated Tires in Binding Wheels; and we do hereby declare that the following is a full, clear, and exact description of the construction and operation of the same, reference being had to the annexed drawings, making a part of this specification, in which—

Figure 1, is a perspective view of the joint use of three of such tongs, affixed to the ring E Fig. 3, centrally, with a heated tire in their adjusted grips, over the wheel to be bound. Fig. 2, shows the construction of said tongs, the rod-handle A, with its hook end, $a$, the tongs, with its leg $c$, two parted and ringed, slipped on to the rod A, thereby forming it into a handle to the other leg B, of the tongs, the grip has an adjusting screw D. The flat, open ring, Fig. 3, has six or more holes for the reception of the hooked end of the rod or rods A.

When three or more hands are employed to handle heavy tire, by the use of the ordinary independent tongs; the tire softened by the heat, is liable to become warped and out of shape, however cautiously handled by the operatives. By this simple arrangement the three or more tongs become a single instrument, by their union with the central ring E, and enable the workmen to raise, carry and place the tire, steadily without twisting or warping it, with perfect ease, to where it is wanted, saving valuable time and vexation of spirit.

The grip handle $c$, with B, can be adjusted to any diameter required, by pushing it back or forth on the rod-handle A.

What we claim as our invention and desire to secure by Letters Patent is—

The rod handled tongs Fig. 2, with its sliding leg, $c$, hooked end $a$, in combination with the ring E, Fig. 3, when made substantially as described, for the purpose specified.

JOHN BRUBAKER.
HENRY BONHOLTZER.

Witnesses at signing—
JACOB STAUFFER,
S. G. MUSSER.